2,787,573

PESTICIDAL COMPOSITIONS AND THEIR USE

Jack S. Newcomer, Grand Island, N. Y., assignor, by mesne assignments, to The Pennsylvania Salt Manufacturing Company, Philadelphia, Pa., a corporation of Pennsylvania No Drawing. Application May 21, 1951,
Serial No. 227,523

9 Claims. (Cl. 167—30)

The present invention pertains to pest control, and to methods and compositions for protecting materials, particularly organic materials, against attack by pests. More particularly, the invention pertains to new compositions which are employed in the control of pests, such as fungi, and bacteria. Still more particularly, the invention pertains to compounds which are extremely effective agents for killing microorganisms, said compounds being of a type to be more particularly described hereinafter.

It is an object of this invention to provide compositions of outstanding value in protecting organic material, both in the natural and artificial state, due to the fact that said compositions are highly effective in controlling economically harmful pests which attack organic material. A further object is to provide compositions which are highly effective, at very low concentrations of active ingredient, in killing microorganisms or preventing or inhibiting their growth. Another object of the invention is to treat agricultural materials, whether in the natural or fabricated state, with the compositions of the invention, thereby both disinfecting and preserving such agricultural products. These and other objects will be apparent from this specification.

In the practice of the invention there is applied to the material which is to be protected against attack by pests, at least one compound having the formula

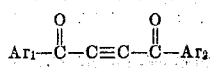

wherein each of $Ar_1$ and $Ar_2$ represent an aryl radical selected from the group consisting of phenyl, biphenylyl, terphenylyl, and naphthyl radicals, said radicals having from 0 to 3 substituents selected from the group consisting of halogen, such as chlorine and bromine, and alkyl radicals, such as those having from 1 to 5 carbon atoms, for example, methyl, ethyl, propyl, butyl, and amyl, said aryl radicals and alkyl substituents including the various isomeric forms thereof. In the case of aryl radicals having more than one substituent per radical, said substituents may be the same or different.

Specific examples of the diketones of this invention are 1,4-diphenyl-2-butyne-1,4-dione; 1,4-bis(o-biphenylyl)-2-butyne-1,4-dione; 1,4-bis(p-terphenylyl)-2-butyne-1,4-dione; 1,4-di-alpha-naphthyl-2-butyne-1,4-dione; 1,4-di-beta-naphthyl-2-butyne-1,4-dione; 1-phenyl-4-p-biphenylyl-2-butyne-1,4-dione; 1-alpha-naphthyl-4-o-terphenylyl-2-butyne-1,4-dione; 1-p-chlorophenyl-4-mesityl-2-butyne-1,4-dione; 1-bromotolyl-4-xylyl-2-butyne-1,4-dione; 1-dichloronaphthyl-4-chlorobiphenylyl-2-butyne-1,4-dione; 1-phenyl-4-methylnaphthyl-2-butyne-1,4-dione; 1-p-tolyl-4-alpha-naphthyl-2-butyne-1,4-dione; and 1-phenyl-4-p-chlorophenyl-2-butyne-1,4-dione.

In a preferred embodiment of the invention, $Ar_1$ and $Ar_2$ are unsubstituted phenyl, biphenylyl, terphenylyl, and naphthyl radicals.

The methods described by Lutz, Journal of the American Chemical Society, 48, 2905-15 (1926) for the preparation of 1,4-diphenyl-2-butyne-1,4-dione are generally applicable in preparing the compounds of my invention.

Improved procedure is illustrated in Examples 1 and 2.

EXAMPLE 1

Triethylamine (17 g.) of high purity was added to a solution of 1,4-diphenyl-2-chloro-2-butene-1,4-dione (27 g.) in ethanol (150 ml.). The mixture turned dark and heat was evolved. The mixture was maintained at about 60° C. for 5 minutes, cooled, and filtered to remove solid triethylamine hydrochloride formed during the reaction. The resulting filtrate was heated to vaporize most of the alcohol. Upon cooling this concentrated solution, a dark solid precipitated. Filtration gave 19 g. of 1,4-diphenyl-2-butyne-1,4-dione, pale yellow in color. Recrystallization from a hexane-benzene mixture gave 16 g. of product, M. P. 111–112° C.

EXAMPLE 2

Triethylamine (115 g.) of high purity was added dropwise, with stirring, to a suspension of 1,4-diphenyl-2,3-dichloro-1,4-butanedione (153 g.) in 1 liter of ethanol. After the addition was completed, the mixture was heated to 60–65° C. for 10 minutes, cooled, and filtered to remove solid triethylamine hydrochloride formed in the reaction. The filtrate was boiled until sufficient ethanol had been removed that a solid began to crystallize. After cooling the solution and filtering it, a yellow solid was obtained. The solid was washed with cold ethanol and dried to give 1,4-diphenyl-2-butyne-1,4-dione (98 g., M. P. 111–112°, 84% yield).

The following examples which are by way of illustration and not of limitation, demonstrate the uncommonly high pesticidal potency of the active ingredients of the invention. The concentrations of active ingredients are expressed in parts by weight.

EXAMPLE 3

1,4-diphenyl-2-butyne-1,4-dione was evaluated as a fungicide by the slide-spore germination procedure, in which the percentage of inhibition of spore germination is determined after a specified incubation period. These tests were conducted in accordance with the American Phytopathological Society method, except that they were continued for three days instead of only one day. The microorganisms employed were the brown peach-rot fungus (*Sclerotinia fructicola*) and the apple bitter-rot fungus (*Glomerella cingulata*). These organisms are typical of those which cause some of the major and difficultly controlled plant diseases. The data obtained are given in Table 1, wherein the abbreviations Scler. and Glom. designate the respective fungi.

Table 1

| Dilution | Formulation | Incubation period, days | Inhibition of Spores, percent | |
|---|---|---|---|---|
| | | | Scler. | Glom. |
| 1:1,000 | Water emulsion | 1 | 100 | 100 |
| | ----do---- | 2 | 100 | 100 |
| | ----do---- | 3 | 100 | 100 |
| 1:10,000 | ----do---- | 1 | 100 | 100 |
| | ----do---- | 2 | 100 | 100 |
| | ----do---- | 3 | 100 | 100 |
| 1:100,000 | ----do---- | 1 | 100 | 100 |
| | ----do---- | 2 | 100 | 100 |
| | ----do---- | 3 | 100 | 100 |
| 1:1,000,000 | ----do---- | 1 | 100 | 100 |
| | ----do---- | 2 | 98 | 100 |
| | ----do---- | 3 | 25 | 100 |

The water emulsions were prepared in the presence of 0.02% of the emulsion of a surface-active agent, e. g., soap.

EXAMPLE 4

Khaki textile strips (1" x 3") were dipped rapidly into acetone solutions containing various concentrations of 1,4-diphenyl-2-butyne-1,4-dione. The strips were then placed across a coarse screen and allowed to dry, after which they were buried for 19 days in well-rotted manure. The strips were then recovered, washed with water, and allowed to dry. The degree of protection of the fabrics was determined by visual observation and also by determining the tensile strength of the strips. Similar experiments were carried out with a commercial fungicide, namely, bis(3-chloro-6-hydroxyphenyl)methane. The data obtained are illustrated as follows:

| Active Ingredient | Concentration of Solution, percent | Tensile Strength, lbs.[1] |
| --- | --- | --- |
| A | 0.1 | 12, 13, 18 |
| A | 0.25 | 67, 81, 107 |
| A | 1.0 | 164, 151, 161 |
| B | 0.1 | 42, 67, 86 |
| B | 0.25 | 126, 100, 158 |
| B | 1.0 | 158, 165, 174 |
| Control (untreated fabric) | | 7 |

A = 1,4-diphenyl-2-butyne-1,4-dione.
B = bis(3-chloro-6-hydroxyphenyl)methane.
[1] Experiments at the various concentrations of the respective protectants were done in triplicate.

It is to be understood that any active ingredient of the invention may be substituted for the active ingredient of Examples 3 and 4 for pest control purposes, and that the specific pests employed are merely representative of pests against which my compositions may be used.

It will be understood that my active ingredients may be used individually or in admixtures with each other for the desired purposes.

The active ingredients of this invention may be applied in a variety of ways to materials which are to be protected against attack by microorganisms, such as by dusting, spraying, dipping, or tumbling, as best suits the protection problem at hand. They may be used as such in certain cases, but more frequently they are formulated with carriers before application. Carriers may be liquid, for example, water or certain oils, or solid, for example, any of the solid carriers or mixtures thereof more particularly referred to hereinafter.

Compositions may be formulated by mixing the active ingredients with any desired liquid or solid carriers, such as any of the finely divided solid carriers known in the dusting art, which are preferably of large surface area, such as clays, for example, fuller's earth, pyrophyllite, talc, bentonite, kieselguhr, diatomaceous earth, etc. Any of the commercial clays available on the market in finely divided form may be used, and particularly those which are normally employed as insecticide carriers. Commercial clays, it will be understood, are generally identified by trade names (reflecting the source and mode of processing), of which Homer clay, Celite, and Tripoli may be mentioned as typical.

Non-clay carriers which may be formulated with my active ingredients include, for example, sulfur, volcanic ash, lime products such as hydrated lime and calcium carbonate, byproduct lignin, lignocellulose, flours such as wood, walnut shell, wheat, soybean, potato and cotton seed, or any other suitable material employed for similar purposes in the art.

Any desired formulation may be prepared by any suitable method. Thus the active ingredient, preferably in finely divided form if a solid, may be tumbled together with the carrier, or the carrier and the active ingredient may be ground together. Alternatively, the active ingredient in liquid form, including solutions, dispersions, emulsions, and suspensions thereof, may be admixed with the solid carrier in finely divided form in amounts small enough to preserve the free-flowing property of the final dust composition. If desired, excess liquid may be removed, such as by vaporization, for example, under reduced pressure.

When solid compositions are employed, in order to obtain a high degree of coverage with a minimum dosage of the formulation, it is desirable that the formulation be in finely divided form. Preferably, the dust containing the active ingredient should be sufficiently fine that substantially all will pass through a 50 mesh sieve, and more particularly through a 200 mesh sieve. Appreciably larger particle size is less conducive to obtaining an economic application of the material; finer dusts, although they have excellent covering capacity, are somewhat more subject to drift and are more expensive to prepare.

For dusting purposes I prefer a formulation in which the active ingredient is present to the extent of say 10–50% by weight of the total. Such amounts normally give free-flowing products which dust easily. However, these concentrations are only indicative of ranges that give desirable qualities to dusting compositions, and formulations may be made with higher or lower active ingredient content. Thus, compositions containing between say 1% to 99% of active ingredient by weight are contemplated, the remainder being carrier and/or any other additive or adjuvant material which may be desired.

It is often advantageous to add small percentages of wetting agents to dust formulations, such as the wetting agents mentioned hereinafter.

For spray application the active ingredient may be dissolved or dispersed in a liquid carrier, such as water or other suitable liquid.

Aqueous solutions or dispersions are economical, and hence are frequently preferred. In general, the choice of the particular liquid carrier employed will be guided somewhat by prevailing circumstances, such as its availability, its solubility or dispersion characteristics toward the particular active ingredient, and in the case of the treatment of plants, by its toxicity to such plants. In general, water is an excellent liquid carrier, although in the case of the treatment of plants a relatively non-phytotoxic oil, such as diesel oil #2, may at times be preferred.

Thus, spray formulations comprising the active ingredient in the form of a solution, suspension, dispersion, or emulsion, in aqueous or non-aqueous media may be employed.

Emulsions or dispersions of the active ingredient in the liquid carrier may be prepared by agitation of the active ingredient with the carrier. In many instances this is done at the time of spraying. Preferably, however, the agitation should take place in the presence of an emulsifying or dispersing agent (surface-active agent), in order to facilitate the preparation of said emulsion or dispersion. Emulsifying or dispersing agents are well-known in the art, and include, for example, fatty alcohol sulfates, such as sodium lauryl sulfate, aliphatic or aromatic sulfonates, such as sulfonated castor oil or fish oil, or the various alkaryl sulfonates (such as the sodium salt of mono-sulfonated nonyl napthalene or tertiary dodecyl benzene), or the soaps, such as sodium oleate and sodium stearate, or non-ionic types of emulsifying and dispersing agents such as the high molecular weight alkyl polyglycolethers or analogous thioethers such as the decyl, dodecyl, and tetradecyl polyglycolethers and thioethers containing from 25 to 75 carbon atoms. Such emulsifying and dispersing agents, it will be noted, also commonly possess wetting agent properties.

The use, if desired, of adjuvants, such as wetting agents and/or humectants, is also contemplated in connection with solutions, suspensions, dispersions, emulsions, or solid formulations of the active ingredient. Any suitable wetting agent and/or humectant may be employed for this purpose, such as the wetting agents more particularly referred to above.

Examples of humectants are glycerine, diethylene glycol, ethylene glycol, polyethylene glycols generally, and well-known sugars and sugar-containing mixtures, such as glucose, fructose, sucrose, dextrins such as white dextrin, canary dextrin, British gum, etc., honey, molasses, maple syrup, maple sugar, and starch syrups such as corn syrup, etc.

For adjuvant purposes, any desired quantity of wetting agent may be employed, such as up to 250% or more, based on active ingredient. For mere wetting purposes, the amount of adjuvant used may be considered to be that required to impart the desired wetting qualities to the spray solution as formulated, such as approximately 0.05% by weight of the spray solution. The use of considerably larger amounts is not based upon wetting properties, although present, but is a function of the physiological behavior of the wetting agent, these considerations being particularly applicable in the case of the treatment of plants.

It should be noted that after liquid formulations of my active ingredients have been applied to plants, the concentration of wetting agent existing upon such treated plants is in no sense a function of the concentration existing in the original formulation. Thus, evaporation might concentrate the wetting agent considerably, or the presence of dew on plant surfaces, or of plant juices on such surfaces might considerably dilute the wetting agent.

It will of course be understood that wetting agents, particularly when in solid form, may be compounded with solid forms of the active ingredient.

Although the active ingredients of this invention may be applied without dilution to materials which are to be protected against attack by microorganisms, it is usually desirable to employ liquid or solid formulations, for example, formulations such as those discussed above. In the case of liquid formulations, the active ingredient usually constitutes less than 30% by weight of the total, such as less than 10% and even as low as 0.1%.

Other substances than the carrier, surface-active agent and/or humectant may be included in solid or liquid formulations of the active ingredients if desired, such other substances including spreaders, stickers, and other auxiliary materials. Active ingredients other than those disclosed herein and compatible with the formulation may be added if desired for any particular purpose. For example, it may at times be expedient to include singly or in combination, substances such as plant response agents, or substances such as fungicides, insecticides, or bactericides other than those agents discussed herein. Also, substances may be added to bring about various physical improvements such as prevention of lumping during storage, etc.

In addition to the treatment of agricultural products generally including growing plants, seeds, etc. for destroying plant disease organisms or preventing or inhibiting their growth, the compositions of this invention are generally useful as bactericidal agents and fungicides. For example my compositions may be employed advantageously as preservatives for such substances as rawhide, adhesives such as glue, gelatin, leather, cellulosic substances such as cork, wood, cotton fabrics, cordage, etc., wool, ink, casein products, and other natural or manufactured products that are subject to attack or decomposition by various bacteria and molds.

It is to be understood that the more particular description given above is by way of illustration, and that various modifications are possible and will occur to persons skilled in the art upon becoming familiar herewith. Accordingly, it is intended that the patent shall cover, by suitable expression in the claims, the features of patentable novelty which reside in the invention.

I claim.

1. A composition prepared for use in combating microorganisms comprising a surface active agent, and a compound having the formula

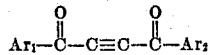

wherein each of Ar₁ and Ar₂ represent an aryl radical selected from the group consisting of phenyl, biphenlyl, terphenlyl and naphthyl radicals, said aryl radicals having from 0 to 3 substituents selected from the group consisting of halogen and alkyl radicals having from 1 to 5 carbon atoms, said composition forming an emulsion with water upon agitation therewith.

2. A composition prepared for use in combating microorganisms which comprises 1,4-diaryl-2-butyne-1,4-dione in which the aryl radicals are unsubstituted, and a surface active agent, said composition forming an emulsion with water upon agitation therewith.

3. A composition prepared for use in combating microorganisms which comprises 1,4-diphenyl-2-butyne-1,4-dione, and a surface active agent, said composition forming an emulsion with water upon agitation therewith.

4. A process for protecting material susceptible to attack by microorganisms which comprises applying to said material an effective amount of a compound having the formula

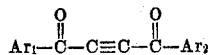

wherein each of Ar₁ and Ar₂ represent an aryl radical selected from the group consisting of phenyl, biphenylyl, terphenylyl and naphthyl radicals, said aryl radicals having from 0 to 3 substituents selected from the group consisting of halogen and alkyl radicals having from 1 to 5 carbon atoms.

5. A process for protecting material subject to attack by microorganisms which comprises applying to said material an effective amount of 1,4-diaryl-2-butyne-1,4-dione in which the aryl radicals are unsubstituted.

6. A process for protecting material subject to attack by microorganisms which comprises applying to said material an effective amount of 1,4-diphenyl-2-butyne-1,4-dione.

7. A process for destroying microorganisms which comprises exposing the same to a lethal concentration of a compound having the formula

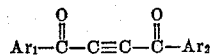

wherein each of Ar₁ and Ar₂ represent an aryl radical selected from the group consisting of phenyl, biphenylyl, terphenylyl and naphthyl radicals, said aryl radicals having from 0 to 3 substituents selected from the group consisting of halogen and alkyl radicals having from 1 to 5 carbon atoms.

8. A process for destroying microorganisms which comprises exposing said microorganisms to a lethal concentration of 1,4-diaryl-2-butyne-1,4-dione in which the aryl radicals are unsubstituted.

9. A process for destroying microorganisms which comprises exposing said microorganisms to a lethal concentration of 1,4-diphenyl-2-butyne-1,4-dione.

References Cited in the file of this patent

UNITED STATES PATENTS

| | | |
|---|---|---|
| 2,357,260 | Joyce | Aug. 29, 1944 |
| 2,532,558 | Kirby | Dec. 5, 1950 |